US010552702B2

(12) United States Patent
Kalyuzhny et al.

(10) Patent No.: US 10,552,702 B2
(45) Date of Patent: Feb. 4, 2020

(54) METHOD AND SYSTEM FOR OPTICAL CHARACTER RECOGNITION OF SERIES OF IMAGES

(71) Applicant: ABBYY Development LLC, Moscow (RU)

(72) Inventors: Aleksey Ivanovich Kalyuzhny, Moscow region (RU); Aleksey Yevgenyevich Lebedev, Orenburg (DE)

(73) Assignee: ABBYY PRODUCTION LLC, Moscow (RU)

( * ) Notice: Subject to any disclaimer, the term of this patent is extended or adjusted under 35 U.S.C. 154(b) by 136 days.

(21) Appl. No.: 15/854,327

(22) Filed: Dec. 26, 2017

(65) Prior Publication Data

US 2019/0188511 A1 Jun. 20, 2019

(30) Foreign Application Priority Data

Dec. 19, 2017 (RU) .................................. 2017144602

(51) Int. Cl.
*G06K 9/32* (2006.01)
*G06K 9/00* (2006.01)
(Continued)

(52) U.S. Cl.
CPC ......... *G06K 9/325* (2013.01); *G06K 9/00449* (2013.01); *G06K 9/00483* (2013.01);
(Continued)

(58) Field of Classification Search
CPC .... G06K 9/325; G06K 9/4604; G06K 9/6267; G06K 9/00483; G06K 9/00449; G06K 9/6218; G06K 2209/01; G06T 3/40
See application file for complete search history.

(56) References Cited

U.S. PATENT DOCUMENTS 5,159,548 A 10/1992 Caslavka
7,620,268 B2 11/2009 Myers et al.
(Continued)

FOREIGN PATENT DOCUMENTS

WO 2015/165524 A1 11/2015

*Primary Examiner* — Menatoallah Youssef
(74) *Attorney, Agent, or Firm* — Lowenstein Sandler LLP

(57) ABSTRACT

Systems and methods for performing OCR of a series of images depicting text symbols. An example method comprises: receiving, by a processing device, a current image of a series of images of an original document, wherein the current image at least partially overlaps with a previous image of the series of images; performing optical symbol recognition (OCR) of the current image to produce an OCR text and a corresponding text layout; associating, using a coordinate transformation, at least part of the OCR text with a first cluster of a plurality of clusters of symbol sequences, wherein the OCR text is produced by processing the current image and wherein the symbol sequences are produced by processing one or more previously received images of the series of images; identifying a first median string representing the first cluster of symbol sequences based on a first subset of images of the series of images; identifying a first template field of a document template corresponding to the first cluster based on the first median string representing the first cluster and the text layout of the current image; analyzing the symbol sequences from the first cluster to identify suitable symbol sequences, wherein the suitable symbol sequences satisfy first parameters of the first template field; identifying, for the first cluster, a second-level median string representing the cluster of symbol sequences based on a plurality of the suitable symbol sequences; producing, using the second-level median string, a resulting OCR text representing at least a portion of the first template field of the original document.

20 Claims, 6 Drawing Sheets

(51) Int. Cl.
*G06K 9/62* (2006.01)
*G06T 3/40* (2006.01)
*G06K 9/46* (2006.01)

(52) U.S. Cl.
CPC ......... *G06K 9/4604* (2013.01); *G06K 9/6218* (2013.01); *G06K 9/6267* (2013.01); *G06T 3/40* (2013.01); *G06K 2209/01* (2013.01)

(56) References Cited

U.S. PATENT DOCUMENTS

| | | |
|---|---|---|
| 7,840,033 B2 | 11/2010 | Kurzwell et al. |
| 8,995,774 B1 | 3/2015 | van Deventer et al. |
| 9,058,536 B1 | 6/2015 | Yuan et al. |
| 9,064,174 B2 | 6/2015 | Nister et al. |
| 9,349,066 B2 | 5/2016 | Koo et al. |
| 2008/0063276 A1* | 3/2008 | Vincent .................. G06K 9/03 382/182 |
| 2015/0324639 A1 | 11/2015 | Macciola |

* cited by examiner

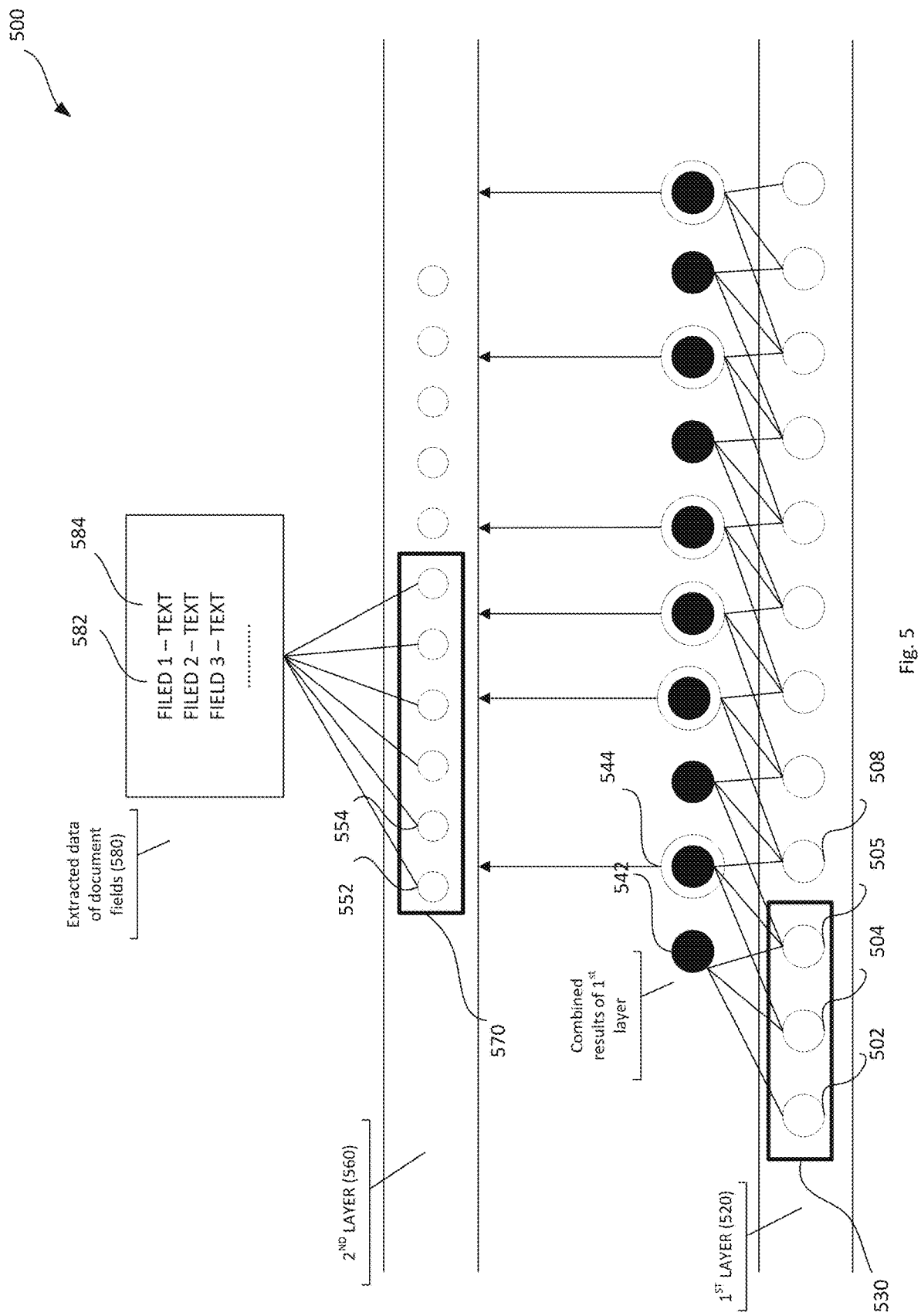

METHOD AND SYSTEM FOR OPTICAL CHARACTER RECOGNITION OF SERIES OF IMAGES

REFERENCE TO RELATED APPLICATIONS

The present application claims the benefit of priority under 35 U.S.C. § 119 to Russian Patent Application No. 2017144602 filed Dec. 19, 2017, the disclosure of which is incorporated herein by reference in its entirety for all purposes.

TECHNICAL FIELD

The present disclosure is generally related to computer systems, and is more specifically related to systems and methods for optical character recognition (OCR).

BACKGROUND

Optical character recognition (OCR) is a computer-implemented conversion of text images (including typed, handwritten, or printed text) into computer-encoded electronic documents.

SUMMARY OF THE DISCLOSURE

In accordance with one or more aspects of the present disclosure, an example method for performing optical character recognition (OCR) of a series of images depicting symbols of a certain alphabet may comprise: receiving, by a processing device, a current image of a series of images of an original document, wherein the current image at least partially overlaps with a previous image of the series of images; performing optical character recognition (OCR) of the current image to produce an OCR text and a corresponding text layout; associating, using a coordinate transformation, at least part of the OCR text with a first cluster of a plurality of clusters of symbol sequences, wherein the OCR text is produced by processing the current image and wherein the symbol sequences are produced by processing one or more previously received images of the series of images; identifying a first median string representing the first cluster of symbol sequences based on a first subset of images of the series of images; identifying a first template field of a document template corresponding to the first cluster based on the first median string representing the first cluster and the text layout of the current image; analyzing the symbol sequences from the first cluster to identify suitable symbol sequences, wherein the suitable symbol sequences satisfy first parameters of the first template field; identifying, for the first cluster, a second-level median string representing the cluster of symbol sequences based on a plurality of the suitable symbol sequences; producing, using the second-level median string, a resulting OCR text representing at least a portion of the first template field of the original document; normalizing one or more symbol sequences from the first cluster to conform these symbol sequences to the first parameters of the first template field; identifying, for the first cluster, a second-level median string representing the cluster of symbol sequences based on a plurality of the normalized symbol sequences; wherein normalizing comprises identifying one or more unconforming symbols in the symbol sequence, wherein the unconforming symbol is a symbol that does not satisfy first parameters of the first template field and replacing the unconforming symbols in the symbol sequence with blank spaces; wherein analyzing the symbol sequences from the first cluster to identify suitable symbol sequences comprises filtering the symbol sequences from the first cluster to filter out "garbage" symbol sequences; wherein the second-level median string is a constrained median string, satisfying second parameters of the first template field; and further comprising determining that the second-level median string cannot be identified; and identifying, for the cluster, a third median string representing the cluster of symbol sequences based on a second subset of images of the series of images different from the first subset of images; wherein the second subset of the series of images comprises the first subset of the series of images. Method may further comprise identifying the document template corresponding the original document based at least on the text layout, produced by the OCR and the identified first median string, wherein the document template is selected from a set of document templates. Method can further comprise when determining that the document template for the original document cannot be identified with a satisfactory confidence level; identifying a fourth median string representing the cluster of symbol sequences based on a third subset of images of the series of images different from the first subset of images.

In accordance with one or more aspects of the present disclosure, an example system for performing optical character recognition (OCR) of a series of images depicting symbols of a certain alphabet may comprise: a memory; a processing device, coupled to the memory, the processing device configured to. receive, by a processing device, a current image of a series of images of an original document, wherein the current image at least partially overlaps with a previous image of the series of images; perform optical character recognition (OCR) of the current image to produce an OCR text and a corresponding text layout; associate, using a coordinate transformation, at least part of the OCR text with a first cluster of a plurality of clusters of symbol sequences, wherein the OCR text is produced by processing the current image and wherein the symbol sequences are produced by processing one or more previously received images of the series of images; identify a first median string representing the first cluster of symbol sequences based on a first subset of images of the series of images; identify a first template field of a document template corresponding to the first cluster based on the first median string representing the first cluster and the text layout of the current image; analyze the symbol sequences from the first cluster to identify suitable symbol sequences, wherein the suitable symbol sequences satisfy first parameters of the first template field; identify, for the first cluster, a second-level median string representing the cluster of symbol sequences based on a plurality of the suitable symbol sequences; produce, using the second-level median string, a resulting OCR text representing at least a portion of the first template field of the original document; normalize one or more symbol sequences from the first cluster to conform these symbol sequences to the first parameters of the first template field; identify, for the first cluster, a second-level median string representing the cluster of symbol sequences based on a plurality of the normalized symbol sequences; wherein normalizing comprises identifying one or more unconforming symbols in the symbol sequence, wherein the unconforming symbol is a symbol that does not satisfy first parameters of the first template field and replacing the unconforming symbols in the symbol sequence with blank spaces; wherein analyzing the symbol sequences from the first cluster to identify suitable symbol sequences comprises filtering the symbol sequences from the first cluster to filter out "garbage" symbol sequences; wherein the second-level median string is a constrained median string, satisfying second parameters of the first template field; and further comprising determining that the second-level median string cannot be identified; and identifying, for the cluster, a third median string representing the cluster of symbol sequences based on a second subset of images of the series of images different from the first subset of images; wherein the second subset of the series of images comprises the first subset of the series of images.

In accordance with one or more aspects of the present disclosure, an example computer-readable non-transitory storage medium may comprise executable instructions that, when executed by a processing device, cause the processing device to: receive, by a processing device, a current image of a series of images of an original document, wherein the current image at least partially overlaps with a previous image of the series of images; perform optical character recognition (OCR) of the current image to produce an OCR text and a corresponding text layout; associate, using a coordinate transformation, at least part of the OCR text with a first cluster of a plurality of clusters of symbol sequences, wherein the OCR text is produced by processing the current image and wherein the symbol sequences are produced by processing one or more previously received images of the series of images; identify a first median string representing the first cluster of symbol sequences based on a first subset of images of the series of images; identify a first template field of a document template corresponding to the first cluster based on the first median string representing the first cluster and the text layout of the current image; analyze the symbol sequences from the first cluster to identify suitable symbol sequences, wherein the suitable symbol sequences satisfy first parameters of the first template field; identify, for the first cluster, a second-level median string representing the cluster of symbol sequences based on a plurality of the suitable symbol sequences; produce, using the second-level median string, a resulting OCR text representing at least a portion of the first template field of the original document; normalize one or more symbol sequences from the first cluster to conform these symbol sequences to the first parameters of the first template field; identify, for the first cluster, a second-level median string representing the cluster of symbol sequences based on a plurality of the normalized symbol sequences; wherein normalizing comprises identifying one or more unconforming symbols in the symbol sequence, wherein the unconforming symbol is a symbol that does not satisfy first parameters of the first template field and replacing the unconforming symbols in the symbol sequence with blank spaces; wherein analyzing the symbol sequences from the first cluster to identify suitable symbol sequences comprises filtering the symbol sequences from the first cluster to filter out "garbage" symbol sequences; wherein the second-level median string is a constrained median string, satisfying second parameters of the first template field; and further comprising determining that the second-level median string cannot be identified; and identifying, for the cluster, a third median string representing the cluster of symbol sequences based on a second subset of images of the series of images different from the first subset of images; wherein the second subset of the series of images comprises the first subset of the series of images.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 5 schematically illustrate two-level identification of the median string among a plurality of symbol sequences representing the OCR results of the corresponding image fragments, in accordance with one or more aspects of the present disclosure.

DETAILED DESCRIPTION

Figure 1:
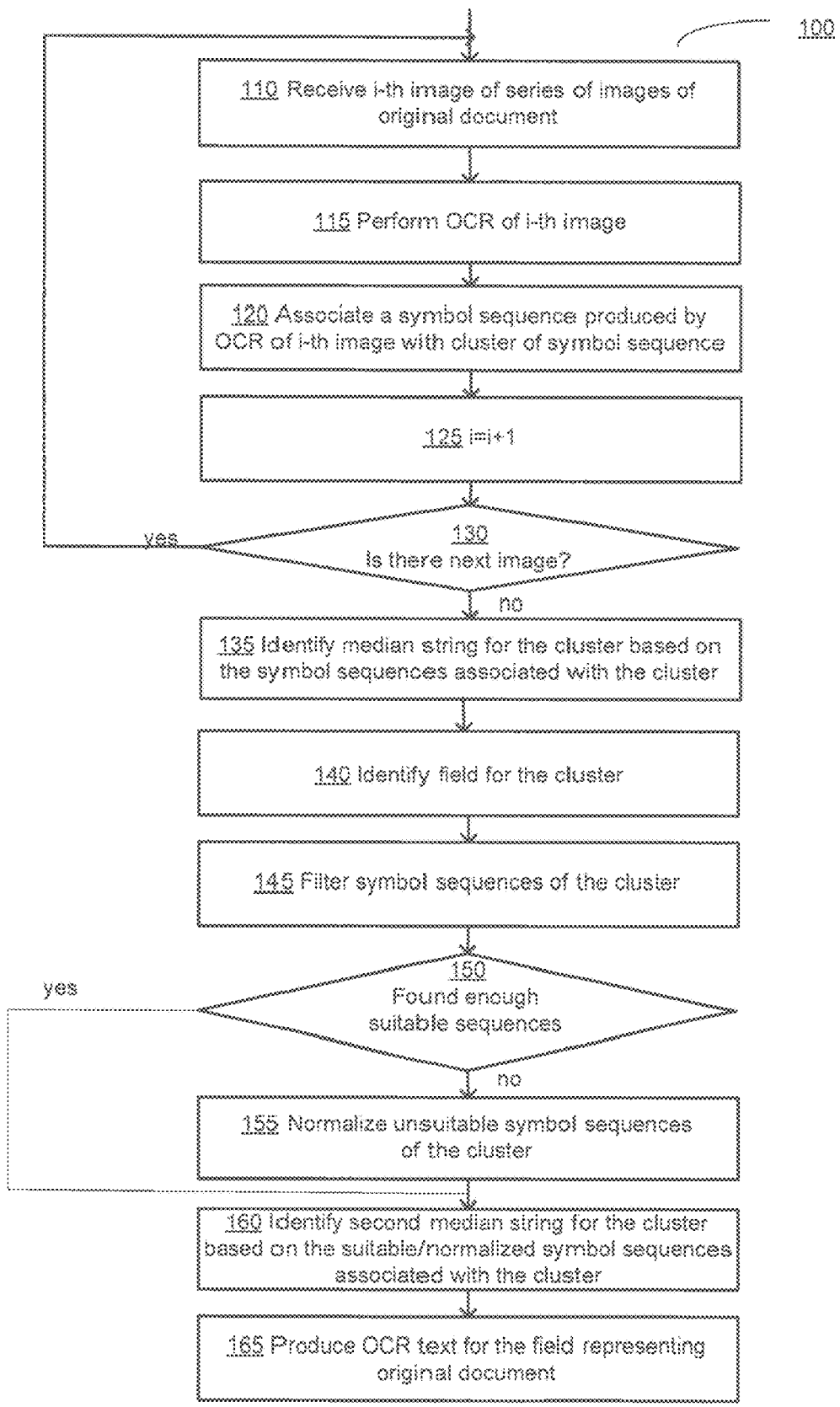
FIG. 1 depicts a flow diagram of one illustrative example of a method for performing optical character recognition (OCR) of a series of images comprising text symbols, in accordance with one or more aspects of the present disclosure.

Described herein are methods and systems for performing optical character recognition (OCR) of a series of images of documents depicting symbols of a certain alphabet with subsequent data extraction. The alphabets whose symbols may be processed by the systems and methods described herein include true alphabets that have separate symbols, or glyphs, representing individual sounds, as well as hieroglyphic alphabets that have separate symbols representing larger units such as syllables or words.

In the following description, the term "document" shall be interpreted broadly as referring to a wide variety of text carrying media, including but not limited to printed or handwritten paper documents, banners, posters, signs, billboards, and/or other physical objects carrying visible text symbols on one or more of their surfaces. "Document image" herein shall refer to an image of at least a part of the original document (e.g., a page of a paper document).

In particular, the documents in the following description contain fields. The term "field" shall be interpreted broadly as referring to a wide variety of document regions, containing text, including fields in a questionnaire, last name, date, or other information on a passport or a driver's license, etc.

An OCR system may acquire a document image and transform the acquired image into a computer-readable and searchable format comprising the textual information extracted from the image of the paper document. The OCR process may be hindered by various image defects, such as visual noise, poor focus or image clarity, glares, etc., which may be routinely caused by the camera shake, inadequate illumination, incorrectly chosen shutter speed or aperture, and/or other conditions and attenuating circumstances. While common OCR methods may not always correctly perform character recognition in the presence of the abovenoted and other image defects, the systems and methods described herein may significantly improve the OCR quality by analyzing a series of images (e.g., a sequence of video frames or still images) of the document, as described in more details herein below.

Furthermore, in certain circumstances, the original document cannot be fit into a single image without a significant loss of the image quality. The loss of image quality may be mitigated by acquiring a series of partially overlapping images of multiple fragments of the original document, which, however, may not be suitable for the subsequent OCR processing by common OCR methods. The systems and methods described herein may efficiently combine the results of character recognition performed for the multiple document fragments to produce the text of the original document.

In certain implementations, the text produced by the OCR systems and methods described herein may be further processed, e.g., by further specific data extraction, data verification and collection.

In an illustrative example, a computer system implementing the methods described herein may receive a series of images (e.g., a sequence of video frames or still images) of the original document. The images may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters.

The computer system may perform OCR of at least selected images of the received series of images to produce the corresponding text and layout information. The layout information may associate the recognized symbols and/or groups of symbols with their respective positions in the original image. In order to combine the results of character recognition performed for consecutively received images, the computer system may compare the text and layout produced by OCR of the currently received image with the text and layout produced by OCR of one or more of previously processed images.

In accordance with one or more aspects of the present disclosure, the computer system may identify clusters of symbol sequences that are likely to represent the same fragment of the original document. These aspects of the present invention are described in details in U.S. patent application Ser. No. 15/168,548, entitled "OPTICAL CHARACTER RECOGNITION OF SERIES OF IMAGES" by Aleksey Kalyuzhny, filed on May 31, 2016.

For each cluster of matching symbol sequences, the median string representing the OCR result of the associated image fragment may be identified. In certain implementations, the median string may be identified as the symbol sequence having the minimal sum of edit distances to all symbol sequences of the cluster. The edit distance, which may in an illustrative example be represented by the Levenshtein distance, between a first symbol sequence and a second symbol sequence may be equal to the minimum number of single-symbol edits (i.e. insertions, deletions or substitutions) required to transform the first symbol sequence into the second symbol sequence.

The texts produced by the OCR of each individual image may differ by one or more words being present or absent in each OCR result, by variations in the symbol sequences representing the words of the original text, by the order of the symbol sequences and/or by presence of so-called "garbage" symbols, i.e. artefacts generated by the system as a result of the defects in the images, that do not exist in the document.

To further improve the quality of symbol recognition, after the medians are identified for one or more clusters, the system identifies fields in the document, corresponding to at least some of the clusters.

A field in a document usually belongs to a certain type, based on format of information expected to be present in this field. For instance, in a field "Date of Birth" we expect to find a symbol sequence representing a calendar date, in a field "State" we expect to find a symbol sequence representing a name of a US State or a two-letter state code. Such information type of a field may be expressed as one or more parameters for the symbol sequences located in this field. Parameters of a field may include the symbol sequence conforming to a certain format (such as data format, font characteristics, etc.), the symbol sequence forming a dictionary word (from a certain language, from a certain word list, etc.), the symbol sequence forming a certain regular expression (such as telephone number, social security number, street address, e-mail address, etc.).

Based on a type of the field identified for a particular cluster the system filters and/or normalizes symbol sequences corresponding to that cluster. The resulting plurality of filtered/normalized symbol sequences may be used to generate a second-level median. Such second-level median, based on a set of filtered/normalized symbol sequences, produces a more accurate reconstruction of the text in the identified field.

Thus the systems and methods described herein allow to consistently improve the result of specific data extraction from a document, to overcome series of errors in OCR results of series of images, such errors as an undetected text or systematic errors that appear under a certain angle and/or are associated with a particular font.

Various aspects of the above referenced methods and systems are described in details herein below by way of examples, rather than by way of limitation.

FIG. 1 depicts a flow diagram of one illustrative example of a method 100 for performing OCR of a series of images comprising text symbols, in accordance with one or more aspects of the present disclosure. Method 100 and/or each of its individual functions, routines, subroutines, or operations may be performed by one or more processors of the computer system (e.g., example computer system 600 of FIG. 6) executing the method. In certain implementations, method 100 may be performed by a single processing thread. Alternatively, method 100 may be performed by two or more processing threads, each thread executing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

For clarity and conciseness, the present description assumes that the processing of each image of an original document is initiated after the image is received by the computer system implementing the method, and that such processing is substantially completed before the next image is received. However, in various alternative implementations, processing of consecutive images may overlap in time (e.g., may be performed by different threads or processes that are running on one or more processors). Alternatively, two or more images may be buffered and processed asynchronously with respect to receiving the other images of a plurality of images received by the computer system implementing the method.

The present disclosure references "a series of images" (e.g., a sequence of video frames or still images) of the original document. The images may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters. In an illustrative example, the images may be selected among consecutive images of the received series of images. The images are individually referenced herein as "the current image" (also referred to as "i-th image" in FIG. 1).

At block 110, the computer system implementing the method may receive the current image of the series of images.

At block 115, the computer system may perform the optical character recognition of the current image, thus producing the recognized text and layout information. The layout information may associate the recognized symbols and/or groups of symbols with their respective positions in the image.

At block 120, the computer system may associate one or more symbol sequences produced by OCR of the current image with a cluster of matching symbol sequences produced by OCR of the previously processed images. The computer system may employ a coordinate transformations to compare positions of recognized symbol sequences in the current and previous images, and thus identify groups of symbol sequences that are likely to represent the same fragment of the original document.

Figure 2:
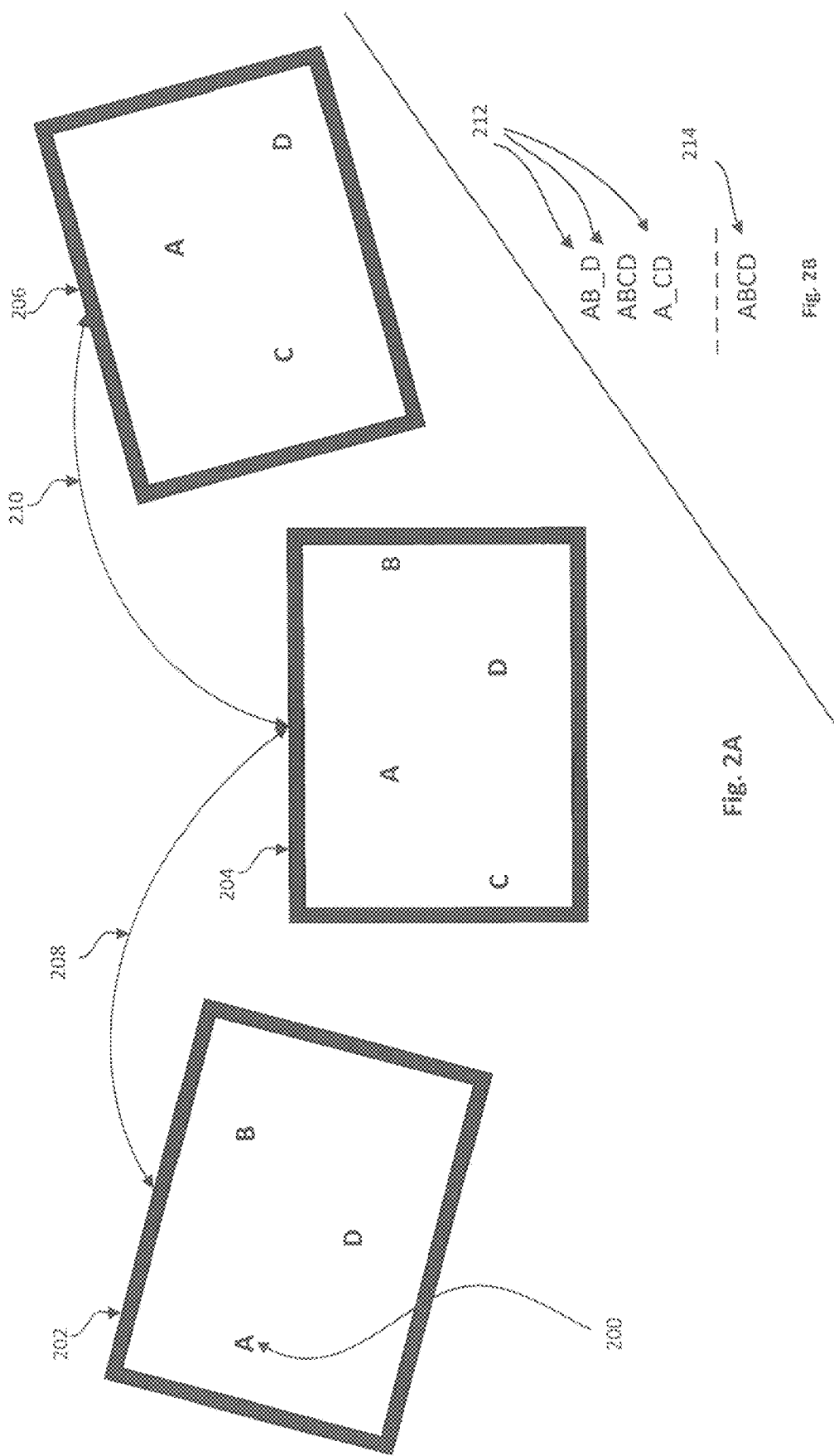
FIG. 2A-2B schematically illustrate an example sequence of three images, projective transformations between pairs of images, and the corresponding symbol sequences produced by the OCR of the respective images, in accordance with one or more aspects of the present disclosure.

FIG. 2A schematically illustrates a sequence of three images 202, 204, and 206, such that the coordinates of the first image 202 may be translated into the coordinates of the second image 204 by applying the projective transformation 208, and the coordinates of the second image 204 may be translated into the coordinates of the third image 206 by applying the projective transformation 210.

In an illustrative example, for an arbitrary chosen symbol sequence in a text produced by the optical character recognition of the current image, the method may identify one or more matching symbol sequences produced by the optical character recognition of other images of the series of images. Notably, "matching symbol sequences" herein refers to both strictly matching and fuzzily matching symbol sequences. In an illustrative example of FIG. 2B, the three matching symbol sequences 212, corresponding to the images 202, 204, and 206, are represented by three different sequences, which are fuzzily matched by the methods described herein.

Figure 3:
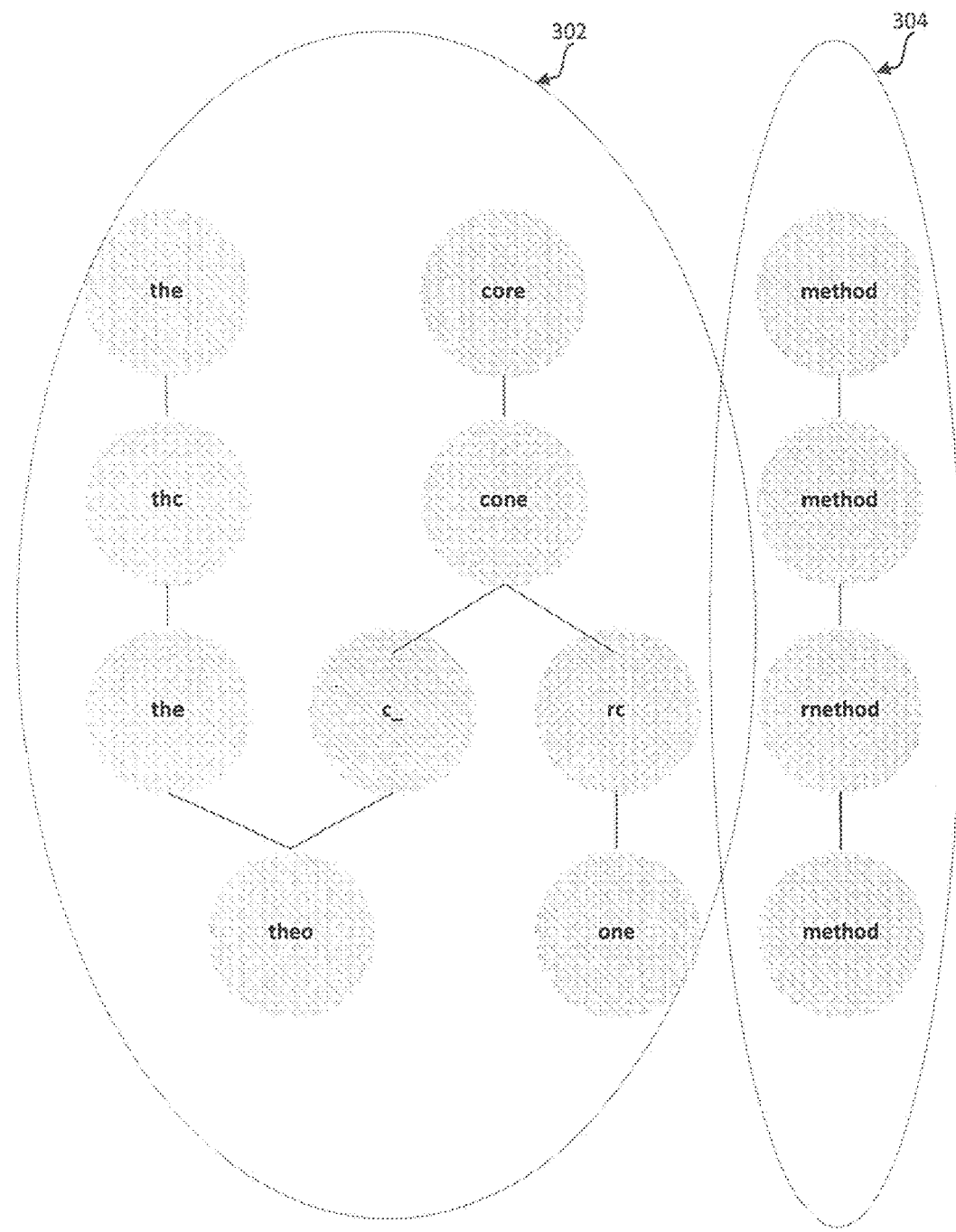
FIG. 3 schematically illustrates an example graph comprising a plurality of clusters of vertices, such that each cluster represents two or more matching symbol sequences, in accordance with one or more aspects of the present disclosure.

In certain implementations, the computer system may produce a graph, the vertices of which represent symbol sequences from the plurality of images, and edges interconnect the symbol sequences that have been identified as matching (i.e., representing the same fragment of the original text) by applying the above-referenced inter-image coordinate transformations. As schematically illustrated by FIG. 3, the resulting graph would comprise a plurality of clusters of vertices, such that each cluster represents two or more matching symbol sequences. The vertices within each cluster are interconnected by respective edges, while individual clusters may be isolated or weakly connected to each other.

FIG. 3 shows two clusters (302, 304) representing OCR produced symbol sequences for two original strings: "the core" and "method."

Referring again to FIG. 1, at block 125, the computer system may increment the counter referencing the current image in the series of images. Notably, operations of block 125 are presented in FIG. 1 for readability of the associated description, and may be omitted in various implementations of the method.

At block 130, the computer system may determine whether there is a next image; if so, the method may loop back to block 110.

At block 135, the computer system may identify the median string of one or more clusters of matching symbol sequences, such that the identified median string would represent the OCR result of the associated image fragment. In some implementations the system uses a set of sequential images of a predetermined size to identify a median string based on the symbol sequences corresponding to the images from this set. In other implementations the images in the set are not sequential. In some implementations set of different sizes are used for different clusters. In some implementations the size of the set of images is determined dynamically.

Figure 4A:
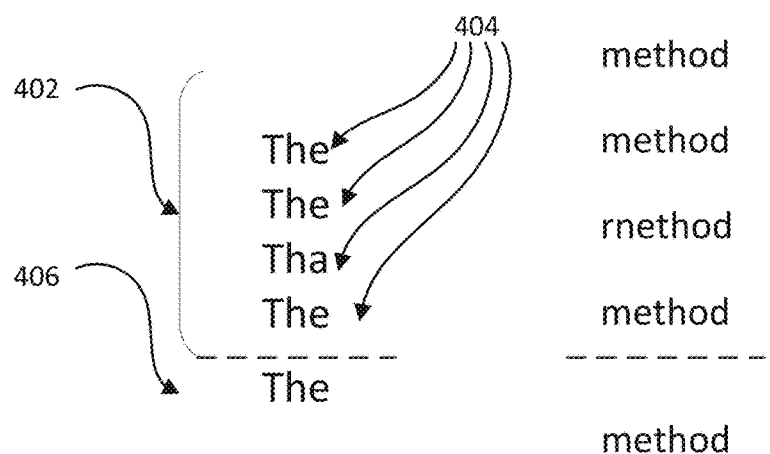
FIGS. 4A-4C schematically illustrate identifying the median string among a plurality of symbol sequences representing the OCR results of the corresponding image fragments, in accordance with one or more aspects of the present disclosure.

As schematically illustrated by FIG. 4A, each cluster 402 may comprise a plurality of matching symbol sequences 404, and the OCR result of the associated image fragment may be represented by the median string 406. In certain implementations, the median string may be identified as the symbol sequence having the minimal sum of edit distances to all symbol sequences of the cluster. The edit distance, which may in an illustrative example be represented by the Levenshtein distance, between a first symbol sequence and a second symbol sequence may be equal to the minimum number of single-symbol edits (i.e. insertions, deletions or substitutions) required to transform the first symbol sequence into the second symbol sequence.

Figure 4B:
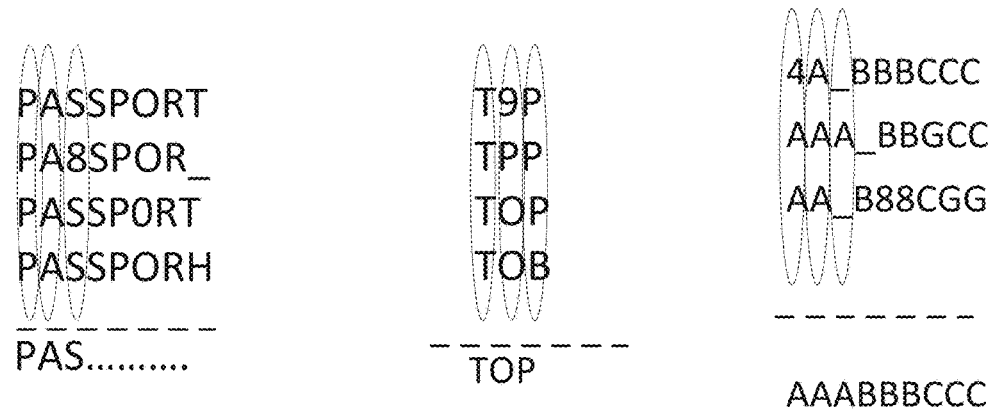
Figure 4C:
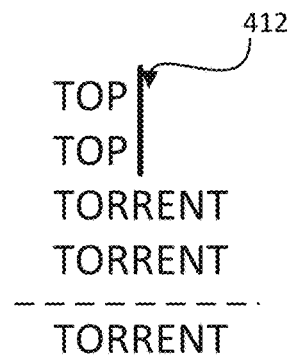

In certain implementations, the computational complexity of identifying the median string may be reduced by applying certain heuristics methods. In an illustrative example, the computer system may heuristically identify the zeroth-order approximation of the median string. The computer system may then align the symbol sequences using strictly matching symbols within each sequence, as schematically illustrated by FIG. 4B. In another illustrative example, the computer system may associate, with each symbol sequence of the cluster, a weight coefficient reflecting the position of the symbol sequence within the image or the OCR confidence metric. As schematically illustrated by FIG. 4C, a cluster 412 comprises four symbol sequences TOP, TOP, TORRENT, TORRENT. The first two symbol sequences represent partial words, since the distance from an edge of the minimum bounding rectangle of the symbol sequence to the edge of the image is less than the whitespace width. Therefore the OCR confidence metric value for the first two symbol sequences is significantly less than the OCR confidence metric value for the remaining two symbol sequences, and hence the symbol sequence TORRENT would be chosen as the median string by the method that takes into account the OCR confidence values.

Referring again to FIG. 1, at block 140 the computer system identifies fields of a template corresponding to one or more clusters of symbol sequences. In some implementations, it is known in advance which template corresponds to the document. In this case, using the known template and the layout information (produces for the document at block 115) the system identifies which field of the known template corresponds to which cluster of symbol sequences.

In some implementations, we do not know in advance which template corresponds to the document. Then the system may identify a corresponding template based on the median strings of the clusters (produced at block 135) and the layout information (produces at block 115). In some implementations the system identifies a corresponding template from a set of templates, produced in advance. In other implementations the system may create a new template based on the median strings of the clusters and the layout information.

Whether the template is known in advance or identified by the system, the layout information produced by the OCR process and the median strings of the clusters are used by the system to determine in which field of the template a specific cluster belongs.

In some implementations the system, after attempting to identify a template, corresponding to the document, determines that such template cannot be identified with a satisfactory level of confidence. In some implementations, when a confident template cannot be found, the system returns to block 135 of FIG. 1 and identifies the median string for the cluster with a different set of images. In some implementation the size of the set of images in changed, usually increased; in other implementations the system selects non-consecutive images for the set, etc.

At block 145 the computer system filters symbol sequences corresponding to a cluster based on the template field identified for this cluster at block 140. As discussed, a field in a template usually belongs to a certain type. The system uses the field type to filter the symbol sequences corresponding to the cluster to identify suitable symbol sequences, satisfying parameters of the identified field. For instance, if a field type is identified as "Date with format mm/dd/yyyy", than from symbol sequences (1) "11/22/2011", (2) "11/22/2014", (3) "11/23/2011", (4) "1122/2011", (5) "14/22/2o11", (6) "11/22/011", (7) "^^12/02I2017_", (8) "_I2/02/2017.", (9) "_I2/o2/S017_" only symbol sequences (1), (2), and (3) are suitable for the field type. The symbol sequences (4)-(9) are unsuitable for the identified field and will be filtered out.

At block 150 the system determines whether the number of suitable symbol sequences is enough to perform a second-level median string identification for the cluster. In some implementations there is a predetermined threshold number of suitable symbol sequences required for the second-level median string identification for the cluster. If the number of suitable symbol sequences found by filtering is above the threshold, the system moves to block 160.

In other implementations the system determines whether there are enough suitable symbol sequences by other means. In some implementations determination 150 is not performed and the system performs normalization 155 of the symbol sequences automatically after filtering.

At block 155 the system performs normalization operation on the unsuitable symbol sequences corresponding to the cluster to conform them to the field type identified for the cluster. As part of the normalization the symbol sequence is analyzed and symbols that do not satisfy the field type requirements are replaced with empty spaces.

For instance, for symbol sequences (4)-(6) above normalization will produce the following suitable symbol sequences:
(4) "11122/2011"→"11 22/2011"
(5) "14/22/2011"→"1 /22/2 11"
(6) "11/22/Z011"→"11/22/ 011"
(7) "^^12/02I2017_"→"12/02 2017"
(8) "_I2/02/2017."→"2/02/20 7."
(9) "_I2/o2/S017_"→"2/ 2/ 017"

In some implementations the filtering 145 is performed simultaneously with normalizing 155. In other implementations the filtering 145 is performed first and the normalizing operation 155 is applied only to the set of unsuitable symbol sequences, identified during filtering 145.

At block 160 the system identifies a second-level median string for the cluster. The second-level median string is identified based on the suitable symbol sequences (from block 145) and normalized symbol sequences (from block 155).

In some implementations the system uses a constrained median string method to identify the second-level median string. A constrained median string method includes the use of a firm external parameter specified for the cluster based on the corresponding field type. Such firm external parameter for the constrained median string is usually different from the parameters used to filter/normalize symbol sequences in blocks 145, 155. Such firm external parameters may be, for instance, a requirement that all symbol sequences used to determine the second-level median string are found in a specific word list (such as a first name list, a last name list, a country name list, etc.) or match a word from a specific set of words or phrases predetermined for the field, etc.

For instance, our set of predetermined suitable words consist of a first name list and the following symbol sequences are used to identify the second-level median string using the constrained median string method:
(1) NLCK
(2) NICK
(3) RICK
(4) HIOK
(5) NLCK In this example if we find a regular median string, the symbol sequences with the smallest distance from all of the symbol sequences will be selected. In the case it will be NLCK, which is not the best outcome. If the system uses the first name list, than both (2) and (3) can be a possible result since they both contain dictionary words. However, if the constrained median string is used, the correct result (2) is identified by the system, because the result (2) has a smaller sum of edit distances from all the other symbol sequences (1, 3, 4, 5) in the cluster than the result (3) has.

FIG. 5 illustrates two-level identification of the median string among a plurality of symbol sequences representing the OCR results of the corresponding image fragments. $1^{st}$ layer of symbol sequences 520 includes all symbol sequences (502, 504, 505, 506, etc.) produced by OCR and associated with the cluster. The first median string 542 is produced based on a first subset of symbol sequences 530 (see block 135, FIG. 1). $2^{nd}$ layer of symbol sequences 560 includes only symbol sequences that are either suitable and/or normalized 552, 554 in relation to the field type of the field 582 identified for the cluster (identified at blocks 145, 155, FIG. 1). The second-level median string is based on a subset 570 of symbol sequences 552, 554, etc. from the $2^{nd}$ layer (identified at block 160, FIG. 1). Extracted data 580 of the document may consist of a field ID 582 of the field, corresponding to the cluster (the field is identified at block 140, FIG. 1), and the second-level median string 584, produced by the present method.

In some implementations the subsets 530 and 570 are different in size. In some implementations, the size of the $2^{nd}$ layer subset of symbol sequences is larger than the size of the 1st layer subset of symbol sequences.

Referring back to FIG. 1, at block 165 the system produces data for the field associated with the cluster based on the second-level median string determined for this cluster.

If one or more of the fields' data are not determined by this process, i.e. the system did not identify the second-level median string for at least some of the fields, and the process can be repeated with a different set of images.

Figure 6:
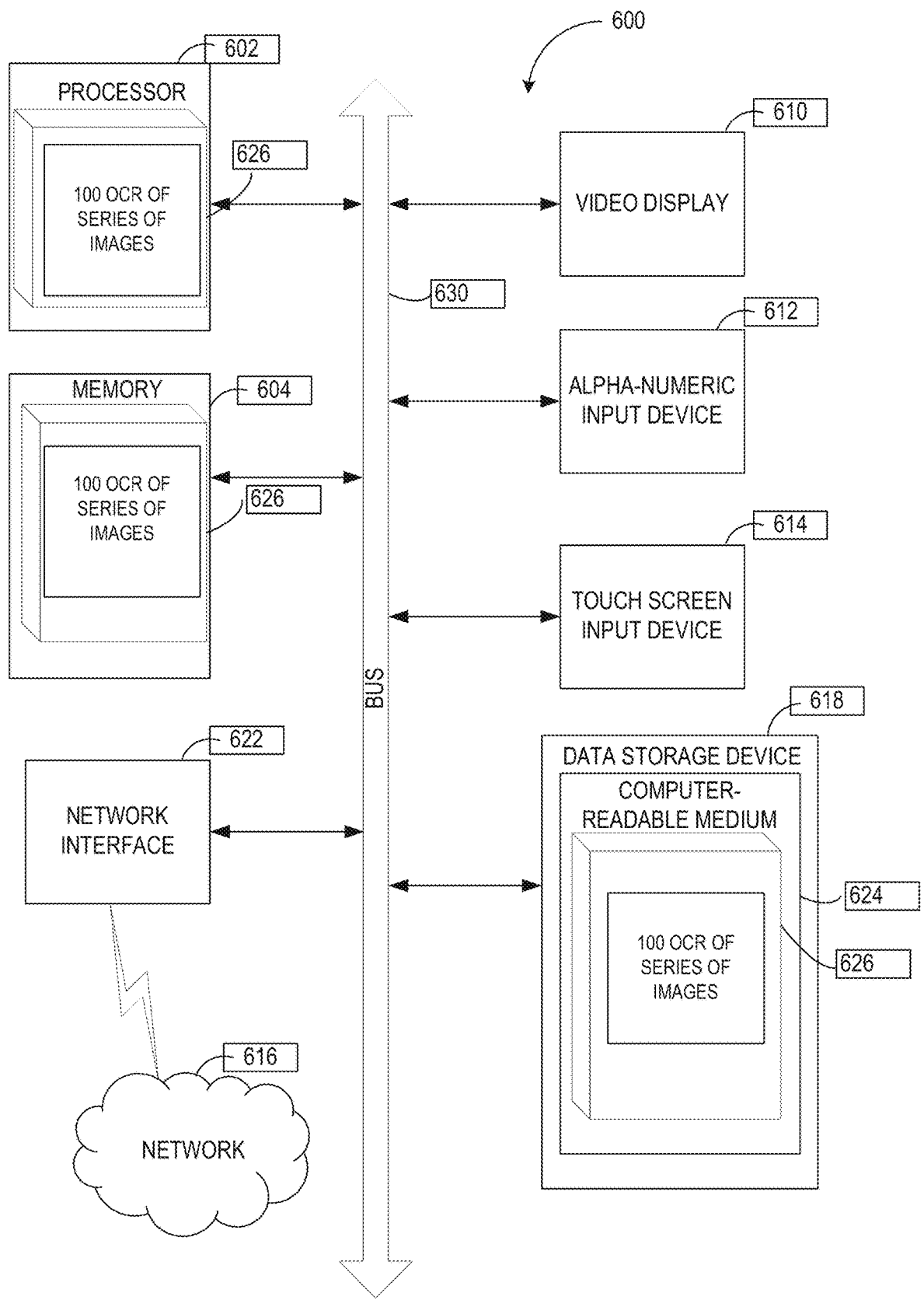
FIG. 6 depicts a diagram of an illustrative example of a computer system implementing the methods described herein.

FIG. 6 depicts a component diagram of an example computer system 600 within which a set of instructions, for causing the computer system to perform any one or more of the methods discussed herein, may be executed. The computer system 600 may be connected to other computer system in a LAN, an intranet, an extranet, or the Internet. The computer system 600 may operate in the capacity of a server or a client computer system in client-server network environment, or as a peer computer system in a peer-to-peer (or distributed) network environment. The computer system 600 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 600 includes a processor 602, a main memory 604 (e.g., read-only memory (ROM) or dynamic random access memory (DRAM)), and a data storage device 618, which communicate with each other via a bus 630.

Processor 602 may be represented by one or more general-purpose processing devices such as a microprocessor, central processing unit, or the like. More particularly, processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute instructions 626 for performing the operations and functions of method 100 for performing OCR of a series of images comprising text symbols, as described herein above.

Computer system 600 may further include a network interface device 622, a video display unit 610, a character input device 612 (e.g., a keyboard), and a touch screen input device 614.

Data storage device 618 may include a computer-readable storage medium 624 on which is stored one or more sets of instructions 626 embodying any one or more of the methods or functions described herein. Instructions 626 may also reside, completely or at least partially, within main memory 604 and/or within processor 602 during execution thereof by computer system 600, main memory 604 and processor 602 also constituting computer-readable storage media. Instructions 626 may further be transmitted or received over network 616 via network interface device 622.

In certain implementations, instructions 626 may include instructions of method 100 for performing OCR of a series of images comprising text symbols, as described herein above. While computer-readable storage medium 624 is shown in the example of FIG. 6 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, by a processing device, a current image of a series of images of an original document, wherein the current image at least partially overlaps with a previous image of the series of images;
   performing optical character recognition (OCR) of the current image to produce an OCR text and a corresponding text layout;
   associating, using a coordinate transformation, at least part of the OCR text with a first cluster of a plurality of clusters of symbol sequences, wherein the OCR text is produced by processing the current image and wherein the symbol sequences are produced by processing one or more previously received images of the series of images;
   identifying a first median string representing the first cluster of symbol sequences based on a first subset of images of the series of images;
   identifying a first template field of a document template corresponding to the first cluster based on the first median string representing the first cluster and the text layout of the current image;
   analyzing the symbol sequences from the first cluster to identify suitable symbol sequences, wherein the suitable symbol sequences satisfy first parameters of the first template field;
   identifying, for the first cluster, a second-level median string representing the cluster of symbol sequences based on a plurality of the suitable symbol sequences; and
   producing, using the second-level median string, a resulting OCR text representing at least a portion of the first template field of the original document.

2. The method of claim 1 further comprising:
   normalizing one or more symbol sequences from the first cluster to conform these symbol sequences to the first parameters of the first template field;
   identifying, for the first cluster, the second-level median string representing the cluster of symbol sequences based on a plurality of the normalized symbol sequences.

3. The method of claim 2 wherein normalizing comprises:
   identifying one or more unconforming symbols in the symbol sequence, wherein the unconforming symbol is a symbol that does not satisfy first parameters of the first template field;
   replace the unconforming symbols in the symbol sequence with blank spaces.

4. The method of claim 1 wherein analyzing the symbol sequences from the first cluster to identify suitable symbol sequences comprises:
   filtering the symbol sequences from the first cluster to filter out "garbage" symbol sequences.

5. The method of claim 1, wherein the second-level median string is a constrained median string, satisfying second parameters of the first template field.

6. The method of claim 1, further comprising:
   determining that the second-level median string cannot be identified;
   identifying, for the cluster, a third median string representing the cluster of symbol sequences based on a second subset of images of the series of images different from the first subset of images.

7. The method of claim 6 wherein the second subset of the series of images comprises the first subset of the series of images.

8. The method of claim 1 further comprising:
   identifying the document template corresponding the original document based at least on the text layout, produced by the OCR, and the identified first median string.

9. The method of claim 8 wherein the document template is selected from a set of document templates.

10. The method of claim 8 further comprising:
    determining that the document template for the original document cannot be identified with a satisfactory confidence level;
    identifying a fourth median string representing the cluster of symbol sequences based on a third subset of images of the series of images different from the first subset of images.

11. A system, comprising:
    a memory;
    a processing device, coupled to the memory, the processing device configured to:
    receive, by a processing device, a current image of a series of images of an original document, wherein the current image at least partially overlaps with a previous image of the series of images;
    perform optical character recognition (OCR) of the current image to produce an OCR text and a corresponding text layout;
    associate, using a coordinate transformation, at least part of the OCR text with a first cluster of a plurality of clusters of symbol sequences, wherein the OCR text is produced by processing the current image and wherein the symbol sequences are produced by processing one or more previously received images of the series of images;
    identify a first median string representing the first cluster of symbol sequences based on a first subset of images of the series of images;
    identify a first template field of a document template corresponding to the first cluster based on the first median string representing the first cluster and the text layout of the current image;
    analyze the symbol sequences from the first cluster to identify suitable symbol sequences, wherein the suitable symbol sequences satisfy first parameters of the first template field;
    identify, for the first cluster, a second-level median string representing the cluster of symbol sequences based on a plurality of the suitable symbol sequences; and
    produce, using the second-level median string, a resulting OCR text representing at least a portion of the first template field of the original document.

12. The system of claim 11 further comprising:
    normalizing one or more symbol sequences from the first cluster to conform these symbol sequences to the first parameters of the first template field;

identifying, for the first cluster, the second-level median string representing the cluster of symbol sequences based on a plurality of the normalized symbol sequences.

13. The system of claim 12 wherein normalizing comprises:
identifying one or more unconforming symbols in the symbol sequence, wherein the unconforming symbol is a symbol that does not satisfy first parameters of the first template field;
replace the unconforming symbols in the symbol sequence with blank spaces.

14. The system of claim 11 wherein analyzing the symbol sequences from the first cluster to identify suitable symbol sequences comprises:
filtering the symbol sequences from the first cluster to filter out "garbage" symbol sequences.

15. The system of claim 11, wherein the second-level median string is a constrained median string, satisfying second parameters of the first template field.

16. The system of claim 11, further comprising:
determining that the second-level median string cannot be identified;
identifying, for the cluster, a third median string representing the cluster of symbol sequences based on a second subset of images of the series of images different from the first subset of images.

17. The system of claim 11 further comprising:
identifying the document template corresponding the original document based at least on the text layout, produced by the OCR and the identified first median string.

18. The system of claim 17 further comprising:
determining that the document template for the original document cannot be identified with a satisfactory confidence level;
identifying a fourth median string representing the cluster of symbol sequences based on a third subset of images of the series of images different from the first subset of images.

19. A computer-readable non-transitory storage medium comprising executable instructions that, when executed by a processing device, cause the processing device to:

receive, by a processing device, a current image of a series of images of an original document, wherein the current image at least partially overlaps with a previous image of the series of images;
performed optical character recognition (OCR) of the current image to produce an OCR text and a corresponding text layout;
associate, using a coordinate transformation, at least part of the OCR text with a first cluster of a plurality of clusters of symbol sequences, wherein the OCR text is produced by processing the current image and wherein the symbol sequences are produced by processing one or more previously received images of the series of images;
identify a first median string representing the first cluster of symbol sequences based on a first subset of images of the series of images;
identify a first template field of a document template corresponding to the first cluster based on the first median string representing the first cluster and the text layout of the current image;
analyze the symbol sequences from the first cluster to identify suitable symbol sequences, wherein the suitable symbol sequences satisfy first parameters of the first template field;
identify, for the first cluster, a second-level median string representing the cluster of symbol sequences based on a plurality of the suitable symbol sequences; and
produce, using the second-level median string, a resulting OCR text representing at least a portion of the first template field of the original document.

20. The system of claim 19 further comprising:
normalizing one or more symbol sequences from the first cluster to conform these symbol sequences to the first parameters of the first template field;
identifying, for the first cluster, the second-level median string representing the cluster of symbol sequences based on a plurality of the normalized symbol sequences.

* * * * *